Oct. 11, 1932.  A. W. SHARP  1,882,195
REEL ASSEMBLY
Filed Feb. 13, 1930
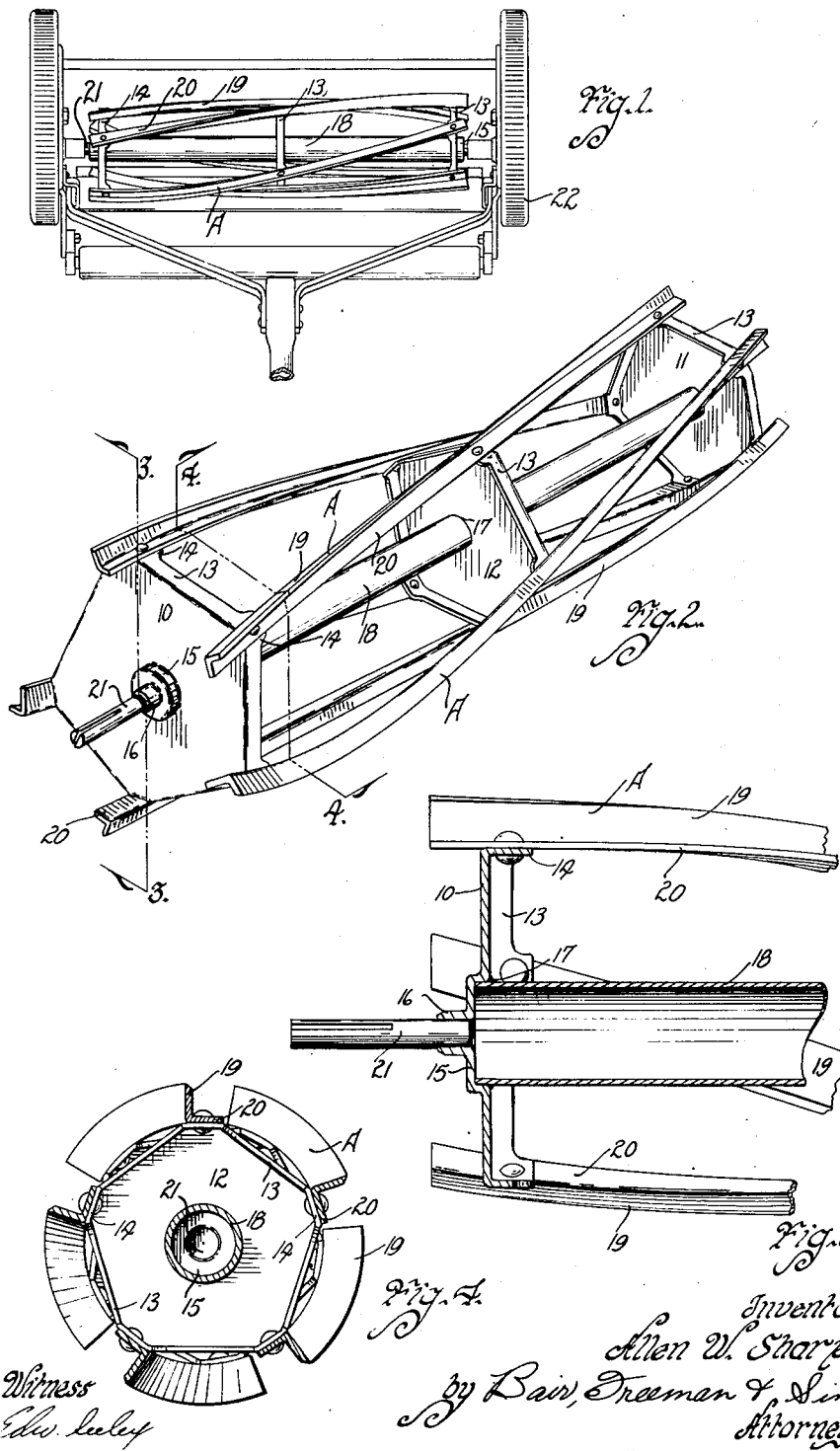
Inventor
Allen W. Sharp
by Bair, Freeman & Sinclair
Attorneys Patented Oct. 11, 1932

1,882,195

UNITED STATES PATENT OFFICE

ALLEN W. SHARP, OF OTTUMWA, IOWA, ASSIGNOR TO JOHNSTON PRESSED GEAR CO., OF OTTUMWA, IOWA, A CORPORATION OF IOWA

REEL ASSEMBLY

Application filed February 13, 1930. Serial No. 428,096.

My invention has to do with the construction of the reel assembly of a lawn mower;—to-wit, the cutting blades and the supporting structure therefor.

My purpose is to provide a reel assembly employing spaced spiders of novel structure, angle bar blades secured thereto in a peculiar manner, and a tubular central member for resisting rotation of the spiders due to the torsional strain or tendency of the blades to straighten.

With these and other objects in view, my invention consists in the construction, arrangement and combination of the various parts of my reel assembly, whereby the objects contemplated are attained, as hereinafter more fully set forth, pointed out in my claims, and illustrated in the accompanying drawing, in which:

Figure 1 is a plan view of a reel assembly, embodying my invention, assembled in a mower.

Figure 2 is a perspective view of the reel assembly.

Figure 3 is a detail, sectional view taken on the line 3—3 of Figure 2; and

Figure 4 is a detail, sectional view taken on the line 4—4 of Figure 2.

Heretofore in reel assemblies for lawn mowers, the blades have been made of flat pieces twisted to lie in a spiral in the surface (so to speak) of a cylinder. To shape notches or attaching surfaces for them, in or on spiders, required much careful preliminary calculation and skilled craftsmanship in construction. Much of this labor I eliminate by using the structure now to be explained.

Referring to Figure 2, it appears that my improved reel assembly has the end spiders indicated generally by the reference numerals 10 and 11, and at least one intermediate spider 12. For economy of material and fabrication, I prefer pressed steel spiders having the peripheral flanges 13. Where five blades are used, the spiders are pentagonal. At the peripheral angles, portions 14 of the flanges 13 are arranged with their outer faces in the shapes of parts of the surface of a cylinder.

This is a structure which is relatively easy to make and which adapts itself to stamping operations.

Each end spider has a cup-shaped center 15, pressed out as shown in Figures 2 and 3, and provided with a central tubular extension 16. The intermediate spider has a central hole 17. A tube 18 has its ends reversed in the cup-shaped centers 15 and brazed or welded or otherwise rigidly secured thereto. The tube 18 extends through the hole 17 and is rigidly fixed to the spider 12.

Blades A are made of angle bars having the blade flanges 19 and attaching flanges 20. The blades A are twisted till the under surfaces of the attaching flanges 20 have the shape of portions of the surface of the cylinder mentioned.

The attaching flanges 20 are fixed to the spider flange portions 14.

Shaft spindles 21 have their ends rigidly fixed in the respective tubular extensions 16. These spindles are operatively connected in any usual way with the mower wheels 22.

A reel assembly of this kind has a number of advantages. The spiders may be stamped by an economical process. The arrangement of the contacting surfaces of spiders and blades in the cylinder surface shape is simple and cheap and makes for accuracy in construction. This arrangement is made possible by using the angle bar blades. The angle bar blades have great strength, combined with light weight, and I am thereby enabled to escape to some degree, the undesirable fly wheel effect of heavy blades.

The blades are shaped as shown, but under the vibration of the regular use of the mower, they tend to straighten out. Consequently, they tend to rotate the end spiders 10 and 11. The use of the tube 18 gives rigidity and strength to the assembly and a maximum resistance to this torsional strain.

The combination and arrangement of the parts provides a reel assembly easy and cheap to fabricate, of great strength and qualities of endurance and of light weight.

It will, of course, be obvious that there may be some changes in structure and arrangement of parts as here illustrated, which would be within the scope of my disclosed invention and such changes I intend to cover by my claims.

I claim as my invention:

1. In a mower reel asembly, an intermediate and spaced end spiders, each having peripheral flange portions in the shape of parts of the surface of a common cylinder, each end spider having an inwardly opening cup-shaped center, angle bar blades, spiral-shaped, each having a blade flange and an attaching flange, the attaching flange having portions in the shape of the surface of such cylinder, secured against corresponding peripheral portions of the spiders, and a tubular means for preventing relative rotation of the spiders fixed to the spiders and having its ends received in said cup-shaped centers.

2. In a mower reel assembly, an intermediate and spaced end spiders, each having peripheral flange portions in the shape of parts of the surface of a common cylinder, each end spider having a cup-shaped center with a reduced tubular extension, angle bar blades, spiral-shaped, each having a blade flange and an attaching flange, the attaching flange having portions in the shape of the surface of such cylinder, secured against corresponding peripheral portions of the spiders, a tubular means for preventing relative rotation of the spiders fixed to the spiders and having its ends received in said cup-shaped centers, and shaft spindles fixed in said extensions.

3. In a mower reel assembly, spaced spiders having peripheral portions, substantially right angular blades, each having one of its flanges to serve as an attaching flange, said attaching flanges being secured to said peripheral portions of said spiders and the other flange of each blade serving as a cutting flange and extending radially outward from said spiders.

4. In a mower reel assembly, spaced end spiders, blades secured to the spiders, said spiders having inwardly opening cup-shaped centers and a central tubular member having its ends positioned in said cup-shaped centers and rigidly connected with the spiders.

5. In a mower reel assembly, an intermediate and spaced end spiders, each having peripheral flange portions in the shape of parts of the surface of a common cylinder, angle bar blades spiral-shaped, each having a blade flange and an attaching flange, the attaching flange having portions in the shape of the surface of such cylinder and secured against corresponding peripheral portions of the spiders and a tubular means for preventing relative rotation of the spiders, said tubular means being fixed to the spiders, said spiders having means to centrally position said tubular means relative to said spiders.

Des Moines, Iowa, February 5, 1930.

ALLEN W. SHARP.